J. G. MacPHERSON.
CLUTCH MECHANISM.
APPLICATION FILED JUNE 17, 1914.
1,131,401.
Patented Mar. 9, 1915.
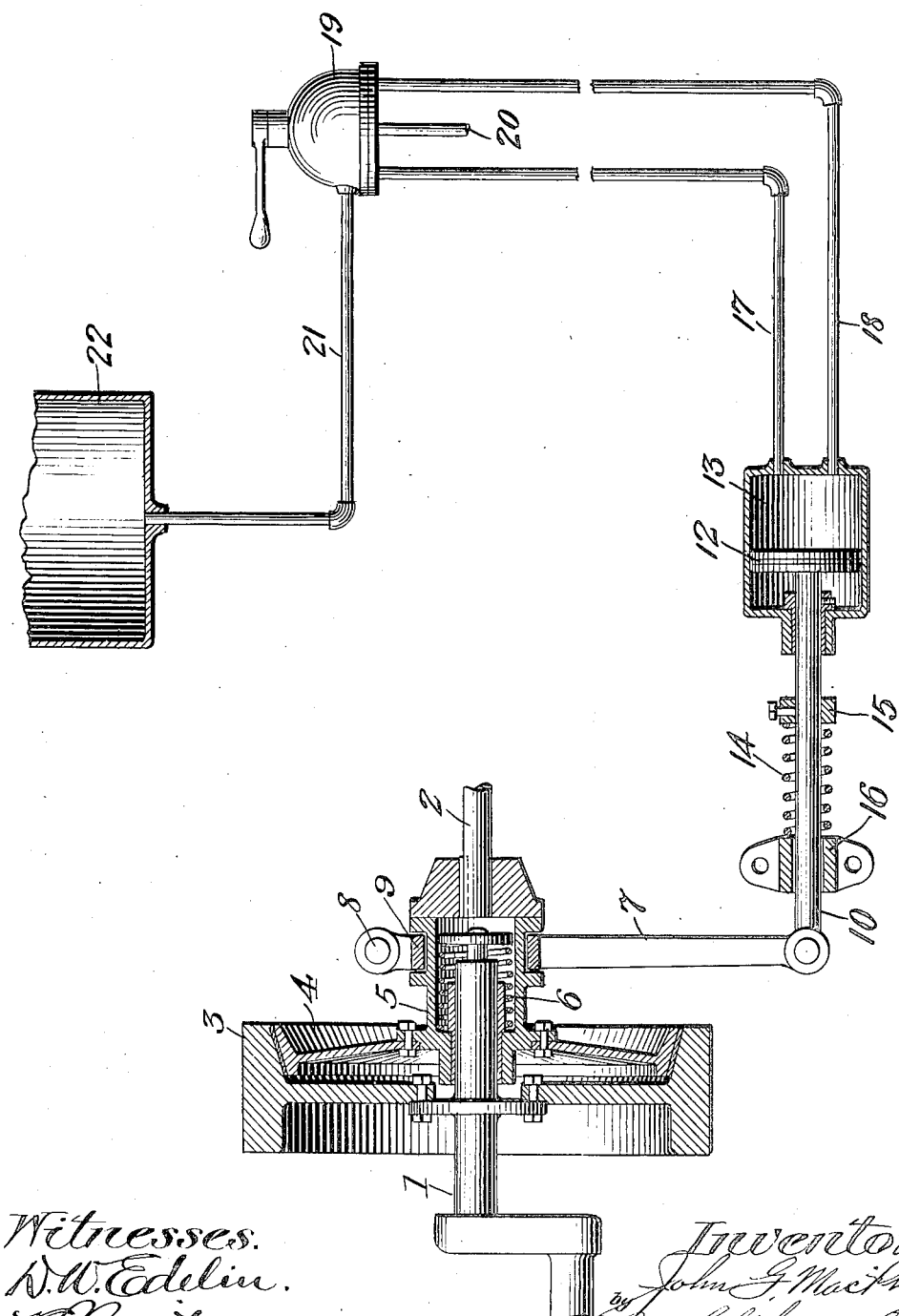

UNITED STATES PATENT OFFICE.

JOHN G. MacPHERSON, OF PHILADELPHIA, PENNSYLVANIA, ASSIGNOR TO JOSEPH C. BAIRD, OF WASHINGTON, PENNSYLVANIA.

CLUTCH MECHANISM.

1,131,401.  Specification of Letters Patent.  Patented Mar. 9, 1915.

Application filed June 17, 1914. Serial No. 845,673.

*To all whom it may concern:*

Be it known that I, JOHN G. MACPHERSON, a citizen of the United States, residing in the city of Philadelphia, county of Philadelphia, State of Pennsylvania, have invented certain new and useful Improvements in Clutch Mechanism; and I do hereby declare the following to be a full, clear, and exact description of the invention, such as will enable others skilled in the art to which it appertains to make and use the same.

The invention relates to clutch operating mechanism, and more particularly to mechanism for controlling clutches of power driven vehicles, such as automobiles, locomotives and the like, employing comparatively large powers, in which the relatively movable members of the clutch are normally moved into engagement with each other to effect the coupling between the driving and driven shafts, by means of a spring or equivalent yielding power applying device. In such clutch operating mechanism as heretofore employed, it has been customary to provide the movable member of the clutch with lever mechanism to retract the same from engagement with the cooperating clutch member, which lever mechanism was arranged to be operated either by hand or foot power, or in the alternative, by some mechanical power-applying devices, such as fluid pressure operated or electrically operated apparatus, by means of which the movable member of the clutch was retracted and held in such retracted position until the power was released, to permit the spring to cause the clutch members to again engage each other. With clutches designed to transmit relatively large powers from the driving to the driven shaft, the heavy spring employed to apply the clutch practically precludes the gradual engagement of the clutch members, but forces the clutch parts together violently, thereby endangering not only the clutch mechanism itself, but transmitting the shocks and strains to the entire driving system including the prime mover. It has been found practically impossible to apply hand or foot power devices to effect the release and engagement of such clutch members to avoid the difficulties enumerated, and even the application of power-operated means to effect the operation of the clutch has proved ineffective to produce a gradual and uniform application of force between the engaging clutch members, which is so essential to the preservation of the apparatus and the smooth, uniform operation of the vehicle.

The purpose of the present invention is to provide means in connection with the spring-applied clutch to produce a steady, even, uniform engaging movement of the clutch members, which will prevent any sudden shocks, jars or strains on the mechanism, and which will also admit of an instantaneous release of the clutch.

To these ends, the invention contemplates the association with a clutch in which the movable member is normally spring-pressed into engagement with its coöperating member, of a second and stronger spring opposing the action of the first spring, means for overcoming and nullifying, preferably gradually, the effect of the second spring, so that the clutch-applying spring will gradually take up its action as the effect of the opposing spring is overcome and the two members of the clutch will be brought into operative engagement without shocks or jars and without imposing any sudden or undue strains on any part of the driving mechanism. The preferred means for overcoming or nullifying the action of the second or heavier spring takes the form of a fluid pressure actuated device under direct control of a simple valve which will apply and release fluid pressure to and from said mechanism, thereby permitting the clutch to be gradually and evenly applied, but to be instantaneously released.

The accompanying drawing is a diagrammatic view, partly in section of a typical friction clutch having the invention applied thereto.

Referring to the drawing, 1 indicates the driving shaft to which is secured one clutch member 3 which takes the form of a fly wheel having a cone surface on one face thereof, which is adapted to be engaged by a mating cone surface on the coöperating clutch member 4, which latter is secured for longitudinal movement on the driven shaft 2 by the usual feather or spline. Within the sleeve 5 of the clutch member 4 there is mounted a helical spring 6, which normally tends to force the clutch member 4 into engagement with its mating member 3. A shipper lever 7, pivoted at 8, is provided with fingers 9 which engage the usual groove in the sleeve 5, whereby the movement of the clutch member 4 in either direction may be controlled in the usual manner.

As thus far described, the apparatus does not differ essentially from the usual form of spring-operated friction clutches commonly employed on automobiles and like vehicles, and in the normal operation thereof, the spring 6 holds the clutch members in coöperating engagement and thereby couples the driving and driven shafts for the transmission of power from the prime mover to the driving axle or axles of the vehicle.

Pivotally secured to the free end of shipper lever 7 is a rod 10, to the forward end of which is secured a piston 12 operating in a cylinder 13, the forward end of which is provided with inlet and exhaust pipes 17 and 18 respectively, which in turn connect with any appropriate form of control valve 19, which latter is provided with an exhaust port which opens to the atmosphere by way of pipe 20. Said valve 19 is in communication with a source of fluid pressure, preferably air, contained in a tank 22, by means of pipe 21. Rod 10 is slidably mounted in an abutment block 16 which is bolted to some stationary part of the machine frame, and surrounding the block and confined under compression between said block and an adjustable collar 15 is a helical spring 14, which is so adjusted as to normally overcome or nullify the effect of the clutch operating spring 6 and thereby hold clutch member 4 out of engagement with coöperating clutch member 3.

The operation of the device as thus described is as follows. When the supply of fluid pressure is cut off from cylinder 13 and the latter is open to the air by way of valve 19, the predominating power of helical spring 14 overcomes the effect of clutch applying spring 6 and causes the shipper lever 7 to move clutch member 4 out of engagement with its coöperating clutch member 3 so that the driving and driven shafts are disconnected. When it is desired to couple the driving and driven shafts, valve 19 is operated to gradually admit air from the supply tank 22 to the cylinder 13, thereby advancing the piston 12 gradually and compressing spring 14 between the stationary abutment 16 and collar 15 by the advancement of piston rod 10, which rocks shipper lever 7 and permits the spring 6 to force movable clutch member 4 into engagement with clutch member 3 with a steady, uniform and gradually increasing pressure. When the piston 12 reaches the limit of its power stroke, the clutch members will be in firm engagement due to the full pressure effect of the spring 6, which effect, however, has been gradually and uniformly applied so that no sudden shock or strain is put upon the clutch members or any of the parts connected therewith. When it is desired to release the clutch, the valve 19 is operated by its handle to shut off the power supplied by the compressed air tank 22 and to open up communication between the air release pipe 18 and the exhaust pipe 20. This relieves the tension of the air in the cylinder 13 and permits the spring 14 to force the piston rearwardly and also to rock shipper lever 7 in a direction to retract clutch member 4 from engagement with clutch member 3, the entire operation being practically instantaneous so that an exceedingly quick release of the clutch is effected.

By adjusting the relative tensions of the springs 6 and 14, the power required to permit the application of the clutch may be nicely controlled and unnecessary expenditure of compressed air avoided. It is necessary only that the power of spring 14 be sufficient to overcome that of spring 6 so that the latter is ineffective to force the clutch members into engagement until the effect of said spring 14 has been practically nullified, and by gradually overcoming or counteracting the effect of spring 14, a gradual and uniform application of the pressure of spring 6 to the movable member 4 of the clutch is possible of realization by the proper manipulation of the handle of valve 19.

The apparatus as illustrated and described is to be regarded as merely exemplary of the invention, and it is to be understood that the invention is capable of many modifications without departing from the essential features of construction and operation. Although a typical form of friction clutch is illustrated, it is apparent that the invention is equally applicable to any of the usual forms of clutches as now employed. Likewise the particular type of mechanism for overcoming the effective action of the counterbalancing spring 14 may be varied to suit conditions, as also may be particular means for connecting the two springs 6 and 14.

What I claim is:—

1. The combination of a clutch having relatively movable engaging members, a spring normally tending to force said members into engagement, a second and stronger spring opposing the action of the first spring, and means for nullifying the effect of the second spring.

2. The combination of a clutch having relatively movable engaging members, a spring normally tending to force said members into engagement, a second and stronger spring opposing the action of the first spring, and means for gradually nullifying the effect of the second spring.

3. The combination of a clutch having relatively movable engaging members, a spring normally tending to force said members into engagement, a second and stronger spring opposing the action of the first spring, and fluid pressure actuated means for nullifying the effect of the second spring.

4. The combination of a clutch having relatively movable engaging members, a spring normally tending to force said members into engagement, lever mechanism for moving one clutch member in opposition to said spring, a second and stronger spring connected with said lever mechanism opposing the action of the first spring, and means for nullifying the effect of the second spring.

5. The combination of a clutch having relatively movable engaging members, a spring normally tending to force said members into engagement, a shipper lever for retracting the movable clutch member, a fluid pressure cylinder, a piston therein, a connecting rod between said piston and said shipper lever, a second and stronger spring interposed between said rod and a fixed abutment normally opposing the action of said first spring, a source of fluid pressure, and connections including a supply and relief valve between said source and said cylinder.

In testimony whereof I affix my signature, in presence of two witnesses.

JOHN G. MacPHERSON.

Witnesses:
ARTHUR L. BRYANT,
CHAS. J. O'NEILL.